Nov. 18, 1941.   D. T. BROCK   2,262,829
BRAKE
Filed April 18, 1939   2 Sheets-Sheet 1

INVENTOR.
BY DENIS TABOR BROCK
Jerome R. Cox
ATTORNEY.

Nov. 18, 1941.　　　　D. T. BROCK　　　　2,262,829
BRAKE
Filed April 18, 1939　　　2 Sheets-Sheet 2

INVENTOR.
BY DENIS TABOR BROCK
Jerome R. Cox
ATTORNEY.

Patented Nov. 18, 1941

2,262,829

UNITED STATES PATENT OFFICE 2,262,829

BRAKE

Denis Tabor Brock, London, England, assignor to Automotive Products Company Limited, London, England Application April 18, 1939, Serial No. 268,593
In Great Britain April 23, 1938

11 Claims. (Cl. 188—10)

This invention relates to brakes for vehicles, and has for its primary object to provide an improved arrangement whereby actuation of a single operating member, such as a brake pedal, applies simultaneously a fluid-pressure brake system operating through pipe lines and a mechanical brake system working by means of rods or cables, the forces applied to the two systems being automatically balanced one against the other with a view to providing a substantially constant ratio between the brake-applying forces on the various wheels of the vehicle.

In a vehicle braking system having a set of brakes which is actuated by pressure liquid fed through pipe lines from a master cylinder unit having operating means, according to the present invention another set of brakes is connected by a mechanical rigging to that part of the master cylinder unit and operating means which receives the reaction force serving to place the master cylinder unit and operating means in equilibrium, so that forces bearing a predetermined ratio are simultaneously applied by the operating means to the master cylinder unit and to the brake rigging respectively.

Thus, there is provided according to the invention a vehicle braking system having a set of brakes which is actuated by pressure liquid fed through pipe lines from a master cylinder unit having operating means, and also another set of brakes which is actuated by a mechanical rigging, a movable part of the latter being arranged to serve as an anchorage for the master cylinder unit or its operating means so that movement of said operating means applies to both sets of brakes simultaneously actuating forces which bear a predetermined ratio to one another. In one arrangement a common operating means is connected by a mechanical force-dividing device, with the rigging and the master cylinder unit respectively whereby both sets of brakes are applied simultaneously by forces bearing a predetermined ratio. Alternatively, the master cylinder unit itself may be mounted upon a movable portion of the mechanical rigging so that when the operating means is moved it creates pressure in the master cylinder unit and at the same time applies through the master cylinder unit a force to the mechanical rigging subsantially proportional to the liquid pressure generated in the master cylinder unit.

Where the master cylinder unit is carried rigidly upon the vehicle, the operating means of said unit preferably comprises a lever pivotally mounted upon an anchorage which has freedom of movement in a direction parallel with the force applied to the master cylinder unit, the lever being also connected with the mechanical rigging to apply a force thereto in a direction also substantially parallel with said freedom of movement. Thus, the anchorage may comprise a link which is pivoted to a fixed support at one end and carries the lever pivotally at the other, the anchorage conveniently being centered by a resilient device comprising a pair of opposed coiled compression springs arranged coaxially upon a plunger having a projection between said springs, and normally disposed in register with a fixed stop member, the arrangement being such that movement of the anchorage from its normal position causes one of the springs to be compressed by the stop member, and thus to urge the plunger to its normal position.

Where the master cylinder unit is interposed between the operating means and the mechanical rigging it may conveniently be carried upon the free end of an angularly movable link pivoted to the vehicle, the brake rigging being connected either directly with the master cylinder unit or to an extension of the supporting link.

The invention is illustrated in the accompanying diagrammatic drawings in which.

Figure 1:
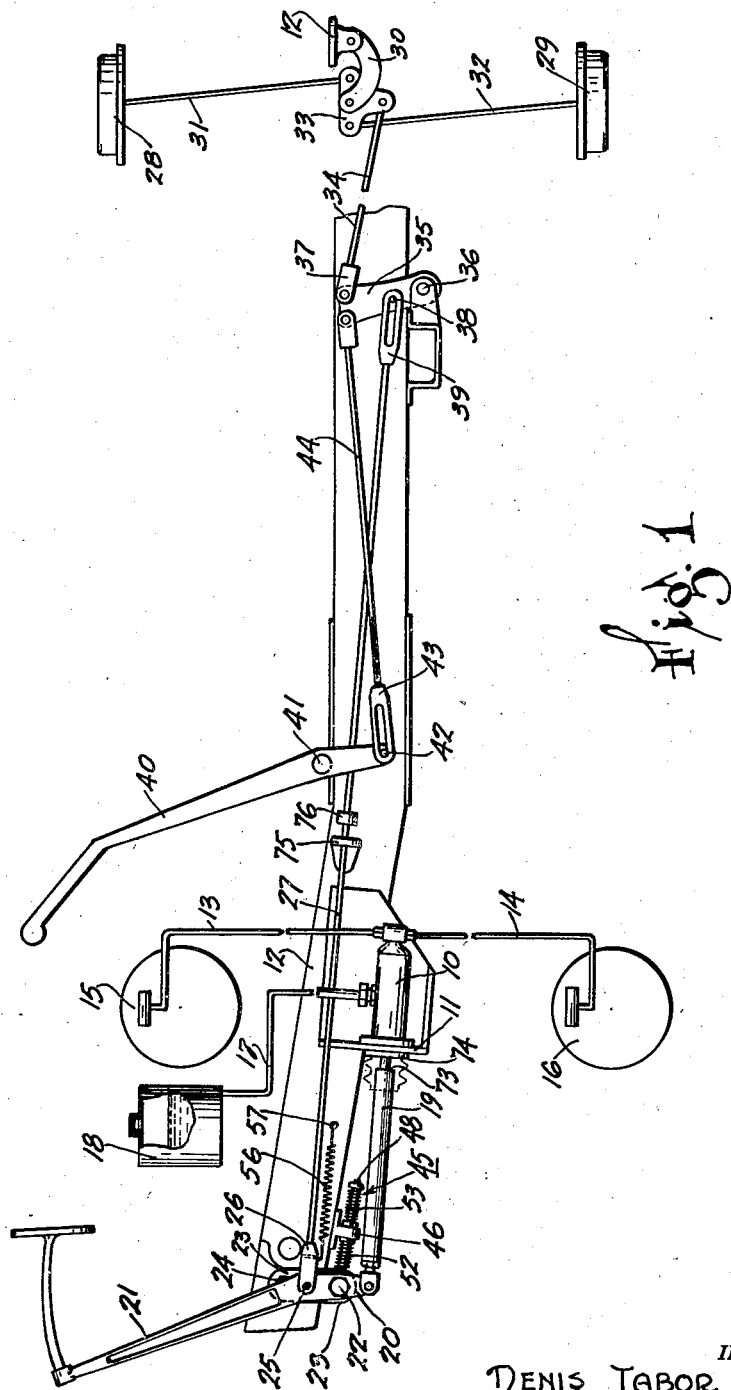
Figure 1 is a side elevation of a braking system for a four-wheeled vehicle, the front wheel brakes being actuated by pressure liquid and the rear brakes being applied by a mechanical rigging.
Figure 2:
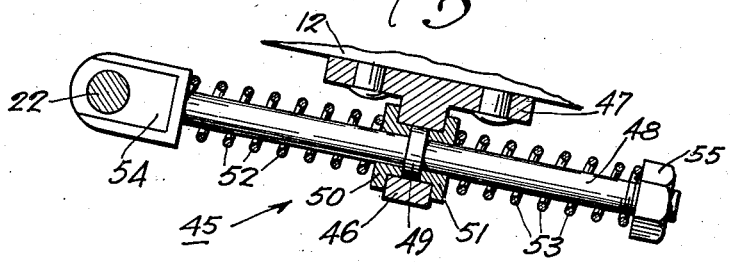
Figure 2 is an enlarged sectional elevation to show the construction of the resilient centralizer device included in Figure 1.

The braking system shown in Figures 1 and 2 comprises a master cylinder unit 10 which is rigidly fixed by means of a bracket 11 to the chassis of the vehicle indicated at 12, said master cylinder unit being arranged to deliver pressure liquid through pipe lines 13 and 14 to front wheel brakes shown diagrammatically at 15 and 16 respectively. A breathing pipe 17 is connected in the usual manner with a reservoir 18 containing a reserve of working liquid. The master cylinder unit 10 is actuated by a push rod 19, and this is connected at its forward end with the lower extremity 20 of a pedal lever 21. The latter is supported in a vertical direction by a bolt 22 secured to a link 23, which latter is pivoted to the chassis 12 by means of a bolt 24. At the point 25 where the pedal lever 21 would normally be pivotally mounted upon the chassis said lever is in the present instance free to move horizontally, and is connected by a U-shaped fitting 26 with a tension rod 27 forming part of a mechanical rigging for applying the rear brakes of the vehicle. These brakes are indicated to a reduced scale at 28 and 29 and the linkage operating them is shown diagrammatically in plan for clarity. The brakes 28 and 29 are arranged to be actuated simultaneously with equal forces by means of transverse tension rods 31 and 32 connected respectively with the ends of a T-shaped equalizing lever 33 having a secondary tension member 34 attached pivotally to the extremity of its middle limb. The lever 33 is secured to the chassis 12 by a link 30 which enables said lever 33 to assume a position wherein the forces in the transverse tension rods 31 and 32 are always equalized. An arm 35 pivoted upon a fixed stud 36 is operatively connected with the front end of the secondary tension rod 34 by means of a U-shaped fitting 37, while a pin 38 provided intermediate the ends of the arm 35 cooperates with a slider 39 provided upon the rear end of the tension member 27 in such a way that the arm 35 can move forwardly without shifting said tension member 27. On the other hand forward movement of the tension member 27 is imparted to the arm 35 and causes the rear brakes 28 and 29 to be applied.

The vehicle is fitted with an auxiliary hand lever 40 for use in emergency and parking, this lever being pivoted to the chassis at 41 and having at its lower extremity a pin 42 which is connected by a slotted fitting 43 with an auxiliary tension rod 44. It will be seen that the rear end of the latter is also pivoted to the upper part of the arm 35, so that when the hand lever 40 is moved rearwardly a pull is exerted upon the tension rod 44 consequently applying the brakes 28 and 29. Owing to the provision of the slotted fitting 39 this movement is not imparted to the pedal lever 21, while in a similar manner the hand lever 40 is not affected when the pedal lever 21 is actuated, this being on account of the slotted fitting 43 which permits the auxiliary tension rod 44 to move rearwardly with the arm 35 without shifting the hand lever 40. The push rod 19 is formed with a shoulder 73 which prevents the whole movement of the pedal lever 21 from being imparted to the master unit 10 should the hydraulic system fail, the shoulder 73 being arranged to abut against a guide member 74 when the normal maximum movement of the rod 19 has taken place. For a similar purpose the tension member 27 passes through an abutment 75 which, in the event of the rear brakes becoming inoperative through breakage, is engaged by a collar 76 fixed on the tension member 27.

With a view to stabilizing the mechanical parts of the braking system when the latter is inoperative, a resilient centralizer device is preferably included, and one form is indicated generally at 45 in Figure 1, this being operatively connected between the bolt 22 and the chassis 12 in such a manner that the link 23 is always urged towards its central vertical position. The construction of the device is shown more clearly in Figure 2, from which it will be seen that it comprises an annular stop member 46 which is formed with a plate 47 secured to the chassis 12. A plunger 48 having a central projection 49 in the form of a radial flange is slidably mounted in the stop member 46, and is fitted with a pair of collars 50 and 51 adapted to bear against the stop member 46. A pair of relatively weak coiled compression springs 52 and 53 respectively are threaded over the plunger member 48 and cooperate at their inner ends with the collars 50 and 51. The outer end of the spring 52 bears against a head 54 which is drilled to fit over the bolt 22, while the outer end of the spring 53 is similarly supported by a nut 55. The two springs 52 and 53 normally center the plunger member 48 by forcing the collars 50 and 51 against the stop member 46, and when said plunger member 48 is moved axially one or other of the springs becomes compressed and so exerts a force which again centralizes the plunger member 48 at the first opportunity. A pedal lever return spring 56 is provided, one end being anchored to the chassis 12 at 57, while the other is hooked through the forked member 26.

When force is applied to the operating means of the master cylinder unit 10, i. e. to the pedal lever 21, a thrust is produced in the push rod 19 and at the same time a tension occurs in the tension rod 27. The fulcrum of the lever 21 is, therefore, indeterminate, and a balance is automatically produced between, on the one hand, the thrust in the push rod 19 tending to apply the front wheel brakes 15 and 16, and on the other hand the tension in the tension rod 27 serving to apply the rear wheel brakes 28 and 29 through the mechanical rigging comprising members 27, 35, 34, 33, 31 and 32. The reaction upon the pedal lever 21 which occurs owing to the production of a thrust in the push rod 19 is thus used to secure a braking force for the rear wheel brakes 28 and 29, which force naturally bears a predetermined ratio with respect to the force exerted in the push rod 19 with the result that when the system is properly adjusted a predetermined ratio is maintained between the applying forces for the front wheel and rear wheel brakes, irrespective of the force which is imparted to the pedal lever 21. It will be appreciated, of course, that the lever 40 serves to actuate only the rear brakes 28 and 29.

Figure 3:
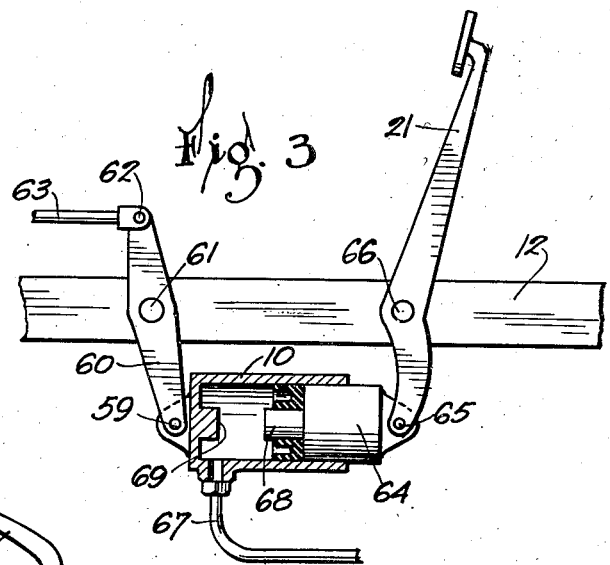
Figure 3 is a part-sectional elevation showing a modified form of brake-applying means.
Figure 4:
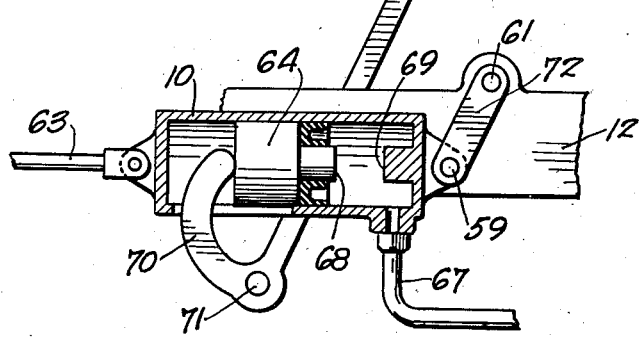
Figure 4 is a similar view of another modification.

The improved result can be obtained with other arrangements and two modifications are shown in Figures 3 and 4 respectively. In Figure 3 the master cylinder unit 10 is not mounted rigidly upon the chassis 12 but is attached pivotally at 59 to the lower end of a lever 60, itself pivoted intermediate its length to the chassis 12 at 61. The upper end of the lever 60 is connected at 62 with a tension rod 63 forming part of the rigging of a mechanical brake and corresponding, for example, to the tension rod 27 in Figure 1. The usual piston 64 of the master cylinder unit 10 is pivoted at 65 to the lower end of the pedal lever 21, which latter in this instance is pivoted at 66 to the chassis 12. A flexible pipe 67 leads to the front wheel brakes of the vehicle, which brakes are actuated by liquid pressure, while the tension rod 63 serves for applying the rear wheel brakes. The piston 64 is provided with an axial projection 68 which, when the maximum normal stroke of the piston 64 has taken place, is arranged to coact with a corresponding projection 69 upon the closed end of the master cylinder unit 10. When a force is applied to the pedal lever 21 the piston 64 is moved into the cylinder of the master unit 10, and thus creates liquid pressure which is transmitted through the pipe 67 to apply the front wheel brakes. The liquid pressure at the same time acts upon the end wall of said cylinder and instead of this reaction force being resisted by the chassis, as would occur if the master cylinder unit were rigidly attached in the usual way, said force is imparted to the lever 60 and serves to apply the rear wheel brakes through the tension member 63. It will be seen that the force applied in this way to the rear wheel brakes is substantially proportional to the liquid pressure produced in the master cylinder unit so that a constant ratio can be obtained governing the applying forces which operate in the front and the rear wheel brakes respectively. Should the hydraulic system fail, for example due to a leakage in the pipe 67, the lever 60 will remain stationary during the first part of the movement of the pedal lever 21 as no pressure will be generated in the master cylinder unit 10. When the pedal lever 21 has moved through a fraction of its maximum travel however, the projection 68 will abut against the stop 69 so that further movement of said pedal lever will be directly imparted to the lever 60 and will serve for applying the rear wheel brakes.

A somewhat similar arrangement is shown in Figure 4, but in this instance the tension rod 63 is connected directly with the master cylinder unit 10, the piston 64 of which is actuated by a curved arm 70 secured to a pedal lever spindle 71. The opposite end of the master cylinder unit is supported by a link 72 pivoted to the chassis 12 at 61 and to the master cylinder unit 10 at 59.

It will be appreciated that the constructional details of the arrangements according to the invention may be adapted to suit requirements and that the member which is connected to operate the mechanical brake rigging may be mounted in a number of ways to permit the desired force transference. Thus, for example, in the case of the master cylinder the latter can be mounted upon slides or could be carried by a cradle which is supported through the medium of a number of links constituting a parallelogram. Further, some at least of the vehicle brakes may be provided with alternative fluid pressure and mechanical applying means, and in such an arrangement all the brakes may have hydraulic wheel cylinders connected by pipe lines with the master cylinder unit, the mechanical operating means of said brakes being coupled to the brake rigging as hereinbefore described.

It is to be understood that the above described embodiments are for the purpose of illustration only and various changes may be made therein without departing from the spirit and scope of my invention.

I claim:

1. A braking system for a vehicle having one set of brakes actuated by fluid pressure and another set of brakes actuated mechanically and having a master cylinder unit carried rigidly upon said vehicle, wherein the operating means of said unit comprises a lever which has freedom of movement in a direction substantially parallel with the force applied to the master cylinder unit, and an anchorage on which said lever is pivotally mounted and wherein there is a mechanical rigging connected to the lever to receive force from the lever in a direction also substantially parallel with said freedom of movement.

2. A braking system for a vehicle comprising one set of brakes having fluid actuation, another set of brakes having mechanical actuation and having a master cylinder unit carried rigidly upon said vehicle, having operating means comprising an anchorage, a lever pivoted on said anchorage, wherein the anchorage comprises a fixed support and a link which is pivoted to said fixed support at one end and carries the lever pivotally at the other, and wherein the lever is also connected with the mechanical rigging to apply a force thereto.

3. A braking system for a vehicle comprising one set of brakes having fluid actuation, another set of brakes having mechanical actuation, a master cylinder unit having operating means, wherein the operating means comprises a lever, an anchorage, said lever being pivotally mounted upon said anchorage, and a resilient device which centers said anchorage when the brakes are inoperative.

4. A braking system for a vehicle comprising one set of brakes having fluid actuation, another set of brakes having mechanical actuation, a master cylinder unit having operating means, wherein the operating means comprises a lever, an anchorage, said lever being pivotally mounted upon said anchorage, and a resilient device which centers said anchorage when the brakes are inoperative, said resilient device comprising a pair of opposed coiled compression springs arranged coaxially upon a plunger having a projection between said springs and normally disposed in registration with a fixed stop member, the arrangement being such that movement of the anchorage from its normal position causes one of the springs to be compressed by the stop member, and thus to urge the plunger to its normal position.

5. A vehicle braking system having a set of brakes, a master cylinder, operating means for said master cylinder which feeds fluid pressure through pipe lines to actuate said set of brakes, another set of brakes, a mechanical rigging for actuating said last named set of brakes, and an angularly movable lever pivoted to the vehicle which carries said master cylinder unit upon its free end and which serves as an anchorage for said master cylinder unit or its operating means so that movement of said operating means applies to both sets of brakes simultaneously, actuating forces which bear a predetermined ratio to one another.

6. A vehicle braking system having a set of brakes, a master cylinder, operating means for said master cylinder which feeds fluid pressure through pipe lines to actuate said set of brakes, another set of brakes, a mechanical rigging for actuating said last named set of brakes, and an angularly movable lever pivoted intermediate its length to the vehicle which lever carries said master cylinder unit upon its free end and in which the free end opposite its attachment to said master cylinder unit is connected with said mechanical brake rigging, said angularly movable lever also serving as an anchorage for said master cylinder unit or its operating means so that movement of said operating means applies to both sets of brakes simultaneously, actuating forces which bear a predetermined ratio to one another.

7. A braking system for a vehicle having one set of brakes actuated by fluid pressure and another set of brakes, and rigging for actuating said other set of brakes mechanically and having a master cylinder unit carried rigidly upon said vehicle, wherein there is provided an operating means for applying force to the master cylinder and to said rigging, wherein the operating means for said unit comprises a lever which has freedom of movement in a direction substantially parallel with the force applied to the master cylinder unit and wherein a stop is provided in conjunction with said master cylinder unit to limit positively the permissible stroke thereof and enable force to be imparted to the rigging by the operating means should a failure occur in the fluid pressure brakes, and an anchorage on which said lever is pivotally mounted and wherein there is a mechanical rigging connected to the lever to receive force from the lever in a direction substantially parallel with said freedom of movement.

8. A vehicle braking system comprising an applying lever, a hydraulic master cylinder unit, a brake associated with the said master cylinder unit, a mechanical brake rigging connected to said applying lever by said master cylinder unit, a brake associated with the said mechanical brake rigging, and an angularly movable link member pivotally secured to the cylinder part of the master cylinder unit and attaching said unit to the vehicle.

9. A vehicle braking system comprising an applying lever, a hydraulic master cylinder unit, an angularly movable link member pivotally secured to the cylinder part of the master cylinder unit and attaching said unit to the vehicle, and a mechanical brake rigging connected to said applying lever by said master cylinder unit, said master cylinder unit being free to move axially so that part of the work from said lever when the brakes are applied is absorbed by the master cylinder unit to create liquid pressure for applying the brakes and part of the work from said lever is absorbed by said mechanical brake rigging.

10. A vehicle braking system comprising an applying lever, a hydraulic master cylinder unit, a mechanical brake rigging connected to said applying lever through the medium of said master cylinder unit, a piston associated with said master cylinder unit adapted to receive a thrust force from the applying lever to create liquid pressure, and a supporting lever carrying the cylinder portion of said master cylinder unit, said supporting lever being pivoted intermediate its length to the vehicle and the free end of the supporting lever opposite to its attachment to the master cylinder unit being connected with the mechanical brake rigging.

11. A vehicle braking system comprising a first set of brakes, means including a master cylinder having fluid therein for actuating said first set of brakes, a second set of brakes, mechanical rigging for actuating said second set of brakes, means for putting the fluid in the master cylinder under pressure, said last named means being anchored on a movable part of the mechanical rigging so that movement of said last named means applies to both sets of brakes simultaneously actuating forces which bear a predetermined ratio to one another.

DENIS TABOR BROCK.